United States Patent
Demopoulos et al.

(10) Patent No.: US 8,990,726 B2
(45) Date of Patent: Mar. 24, 2015

(54) TEXT BOX CLEARING SELECTOR

(75) Inventors: Ryan J. Demopoulos, Bellevue, WA (US); Christine C. Stawitz, Seattle, WA (US); Moneta Ho Kushner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 13/230,603

(22) Filed: Sep. 12, 2011

(65) Prior Publication Data

US 2013/0067386 A1 Mar. 14, 2013

(51) Int. Cl.
| | |
|---|---|
| *G06F 3/048* | (2013.01) |
| *G06F 3/0488* | (2013.01) |
| *G06F 17/24* | (2006.01) |
| *G06F 3/0484* | (2013.01) |
| *G06F 3/0481* | (2013.01) |

(52) U.S. Cl.
CPC ............. *G06F 3/0488* (2013.01); *G06F 17/24* (2013.01); *G06F 3/0484* (2013.01); *G06F 3/04817* (2013.01)
USPC .......................................... 715/780; 715/764

(58) Field of Classification Search
USPC ....................................................... 715/780
See application file for complete search history.

(56) References Cited

U.S. PATENT DOCUMENTS

| | | | |
|---|---|---|---|
| 5,428,349 A | 6/1995 | Baker | |
| 6,072,484 A | 6/2000 | Kuroda | |
| 6,308,042 B1 | 10/2001 | Marsh et al. | |
| 6,691,138 B1 | 2/2004 | Kirkpatrick et al. | |
| 7,299,359 B2 | 11/2007 | Hurley | |
| 7,421,666 B2 | 9/2008 | Vale | |
| 7,818,691 B2 | 10/2010 | Irvine | |
| 2002/0070964 A1 | 6/2002 | Botz et al. | |
| 2003/0110402 A1 | 6/2003 | Park | |
| 2004/0030933 A1 | 2/2004 | Park | |
| 2006/0053301 A1 | 3/2006 | Shin | |
| 2006/0056626 A1 | 3/2006 | Keohane et al. | |
| 2007/0033647 A1 | 2/2007 | Yang et al. | |
| 2008/0221963 A1 | 9/2008 | Altshule et al. | |
| 2011/0270876 A1* | 11/2011 | Gill et al. | ....................... 707/769 |

FOREIGN PATENT DOCUMENTS

| | | |
|---|---|---|
| JP | 2005078472 | 3/2005 |
| KR | 20070084714 | 8/2007 |

OTHER PUBLICATIONS

"Clear icon inside input text," Jun. 6, 2011, Stack Overflow, retrieved from "http://stackoverflow.com/questions/6258521/clear-icon-inside-input-text", pp. 1-8.*

(Continued)

*Primary Examiner* — Dino Kujundzic
(74) *Attorney, Agent, or Firm* — Timothy Churna; Kate Drakos; Micky Minhas

(57) ABSTRACT

In embodiments of a text box clearing selector, a text box is displayed for character entry in a user interface, and the text box includes a text box clearing selector for user-selection to clear the text box. The text box clearing selector is initially concealed from view when the text box is displayed. Character entries can be received in the text box, and the text box clearing selector can then be displayed according to a selector display condition.

17 Claims, 4 Drawing Sheets

(56) References Cited

OTHER PUBLICATIONS

"CSS min-width Property," Jul. 3, 2011, w3schools.com, retrieved from "http://www.w3schools.com/cssref/pr_dim_min-width.asp" via web.archive.org, pp. 1-3.*

Dynamic Drive, "Form field Limiter v2.0," Feb. 25, 2009, Dynamic Drive DHTML scripts, retrieved from "http://www.dynamicdrive.com/dynamicindex16/limitinput.htm", pp. 1-2.*

"PCT Search Report and Written Opinion", Application No. PCT/US2011/055627, (Sep. 25, 2012), 8 pages.

Chee, et al., "Users' Mouse/Cursor Movements in Two Web-Based Library Catalog Interfaces", Retrieved at <<http://www.ntu.edu.sg/home/assgkhoo/papers/chee_khoo.cursor_movements.WWCS2004.pdf>>, In Proceedings of International Conference on Work with Computing Systems, 2004, pp. 640-645.

"Mozilla Password Manager Tricks", retrieved from http://burntelectrons.org/moz/moz-passwords.html #reveal1 on Aug. 10, 2011, 3 pages.

"Better Passwords #1: The Masked Password field", retrieved from http://www.sitepoint.com/better-passwords-1-the-masked-password-field/ on Aug. 10, 2011, 12 pages.

"How to Reveal Hidden Passwords and Unmask Asterisks Without Using any Software!!", retrieved from http://www.inspiredgeek.com/2011/02/05/how-to-reveal-hidden-passwords-and-unmask-asterisks-without-using-any-software/ on Aug. 10, 2011, 3 pages.

"Reveal the Password in a Password Field on a Web Page", retrieved from http://hints.macworld.com/article.php?story=20110329103432511, (Mar. 31, 2011), 4 pages.

"Non-Final Office Action", U.S. Appl. No. 13/230,599, Dec. 5, 2013, 15 pages.

"Style Object display Property", Retrieved from <http://web.archive.org/web/20110215072649/http://www.w3schools.com/jsref/prop_style_display.asp> on Dec. 6, 2013, Oct. 17, 2009, 3 pages.

"Disabling a button if the textbox is empty using Javascript", Retrieved from <http://forums.asp.net/t/1445574.aspx> on Dec. 6, 2013, Dec. 5, 2013, 3 pages.

"Final Office Action", U.S. Appl. No. 13/230,599, Jun. 2, 2014, 16 pages.

\* cited by examiner

TEXT BOX CLEARING SELECTOR

BACKGROUND

Portable computing devices, such as mobile phones, portable and tablet computers, entertainment devices, handheld navigation devices, and the like are commonly implemented with a touch-screen display designed for user touch-input of text characters and passwords, such as in text entry boxes in a user interface form, page, or document. Text editing controls allow a user to input text characters into a text box, such as on a touch-screen, or with a keyboard, mouse, or similar input device.

A device user may type some text into a text box, such as in a single-line form text box or text search box, and then decide to clear the text and start over, entering different text or search terms. Most device users typically backspace to delete each entered text character one at a time. Most device users are also typically unaware of keyboard shortcuts to clear the entered text characters from a text box, such as Ctrl+A and the Delete key. Some text editing controls are now designed with a clear button as a user-selectable control that, if pressed or selected, will clear the entered text characters from a text box.

However, clear buttons are generally useful for text boxes in which a user can enter at least minimum number of text characters. For example, a text box that is designed for a user to simply enter his or her middle initial likely has a width parameter of only one or two characters, and adding a clear button to the middle initial text box is relatively pointless. A form developer is not likely to take the extra development step to add a clear button to a text box that is limited to only one or two characters because a user is just as likely to backspace to delete the one or two characters from a text box.

An application developer must then make a determination whether to include a clear button with each different text entry box on a case-by-case basis, which adds to the burden of designing an application page, form, or document. Additionally, the developer may also not know an appropriate width threshold to set the width parameter for each of the different text entry boxes. Current form development and design calls for the developer to have to decide and select from two different types of text editing controls, one that has a clear button, and one that does not. This not only adds to the burden of designing the text entry for an application page, form, or document, but also then maintaining the text entry fields for use.

SUMMARY

This Summary introduces simplified concepts of a text box clearing selector, and the concepts are further described below in the Detailed Description and/or shown in the Figures. This Summary should not be considered to describe essential features of the claimed subject matter, nor used to determine or limit the scope of the claimed subject matter.

A text box clearing selector is described. In embodiments, a text box is displayed for character entry in a user interface, and the text box includes a text box clearing selector for user-selection to clear the text box. The text box clearing selector is initially concealed from view when the text box is displayed. Character entries can be received in the text box, and the text box clearing selector can then be displayed according to a selector display condition. When the text box clearing selector is displayed, the character entries can be cleared from the text box when the user-selection of the text box clearing selector is received. Additionally, the text box clearing selector can then be concealed from view again when the character entries are cleared from the text box.

The selector display condition can be based on a parameter that indicates a maximum number of the character entries the text box is implemented to receive. This is also referred to as the width of the text box, and the text box clearing selector can be displayed if the width parameter is at least a minimum number. Alternatively, the text box clearing selector can be displayed if the width parameter is at least a minimum number and when at least one of the character entries is received. Alternatively, the text box clearing selector can be displayed based just on a number of the character entries that are received, and the text box clearing selector is displayed if at least a minimum number of the character entries are received.

BRIEF DESCRIPTION OF THE DRAWINGS

Embodiments of a text box clearing selector are described with reference to the following Figures. The same numbers may be used throughout to reference like features and components that are shown in the Figures.

DETAILED DESCRIPTION

Embodiments of a text box clearing selector are described. As noted above, for conventional application development of a page, form, or document that includes text entry boxes, a developer has to make determinations whether to include a clear button with each different text entry box on a case-by-case basis, which adds to the burden of designing the application page, form, or document. In embodiments, a developer can implement any text entry box as a text box that includes a text box clearing selector, even for a text box that is implemented to receive a maximum of just one character entry. This eliminates the developer having to determine which type of text box to implement, one with a clearing selector or one without the clearing selector, and then having to apply a width threshold for character entries in the text box.

When a text box is displayed for character entry in a user interface, the text box includes a text box clearing selector that is initially concealed from view when the text box is displayed. Character entries can be received in the text box, and the text box clearing selector can then be displayed according to a selector display condition. For example, the selector display condition can be based on a width parameter that indicates a maximum number of the character entries the text box is implemented to receive. The text box clearing selector can then be displayed if the parameter is at least a minimum number. Alternatively, the text box clearing selector can be displayed if the width parameter is at least a minimum number and when at least one of the character entries is received. Alternatively, the text box clearing selector can be displayed based just on a number of the character entries that are received, and the text box clearing selector is displayed for user-selection if at least a minimum number of the character entries are received.

While features and concepts of a text box clearing selector can be implemented in any number of different devices, systems, environments, and/or configurations, embodiments of a text box clearing selector are described in the context of the following example devices, systems, and methods.

Figure 1:
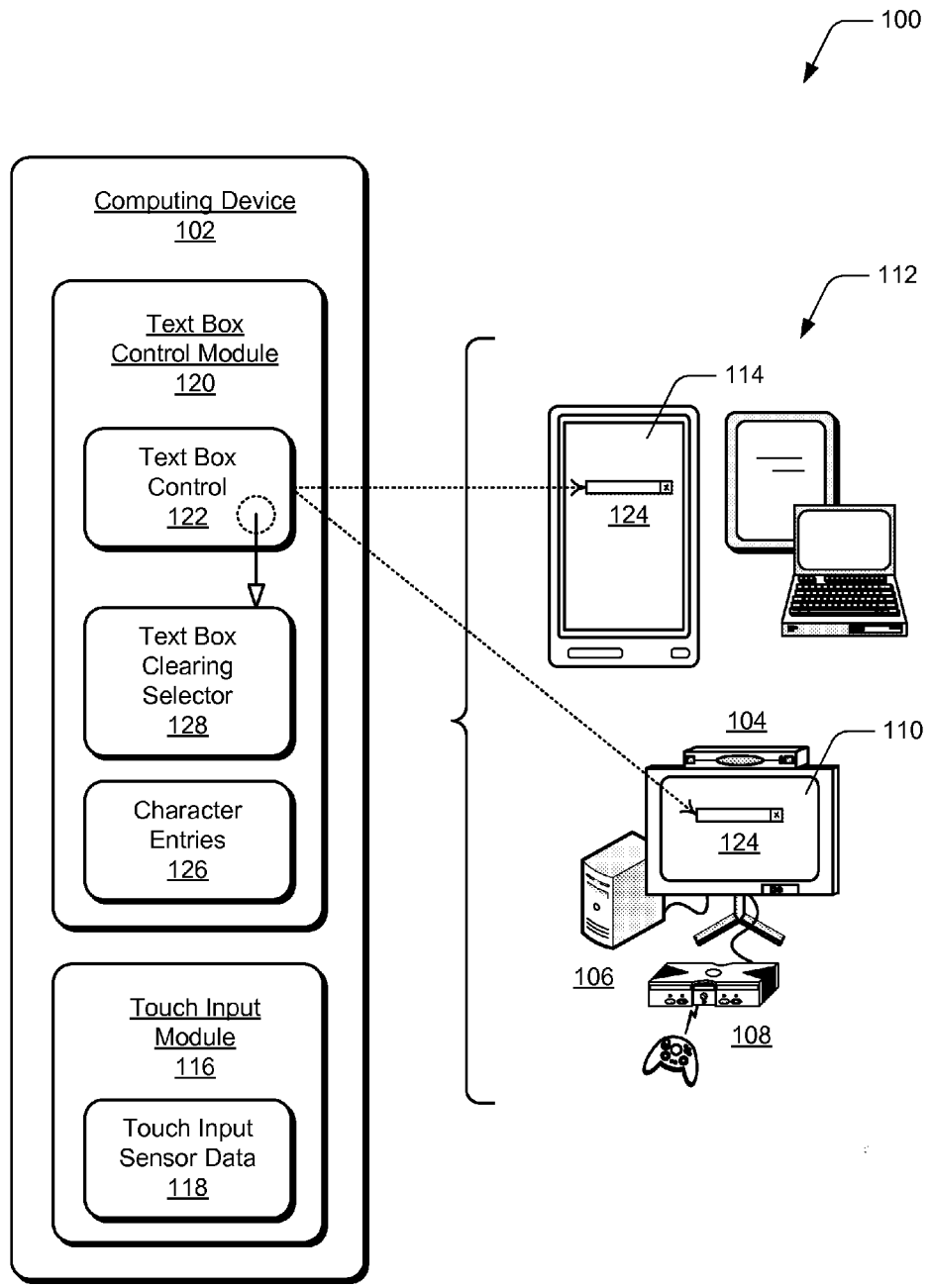
FIG. 1 illustrates an example system in which embodiments of a text box clearing selector can be implemented.

FIG. 1 illustrates an example system 100 in which embodiments of a text box clearing selector can be implemented. The example system 100 includes a computing device 102, which may be any one or combination of a fixed or mobile device, in any form of a consumer, computer, portable, communication, navigation, media playback, entertainment, gaming, tablet, and/or electronic device. For example, the computing device 102 can be implemented as a television client device 104, a computer 106, and/or a gaming system 108 that is connected to a display device 110 to display media content. Alternatively, the computing device may be any type of portable computer, mobile phone, or portable device 112 that includes an integrated display 114. Any of the computing devices can be implemented with various components, such as one or more processors and memory devices, as well as with any combination of differing components as further described with reference to the example electronic device shown in FIG. 4.

The integrated display 114 of a computing device 102, or the display device 110, may be a touch-screen display that is implemented to sense touch and gesture inputs, such as a user-initiated character, key, typed, or selector input in a user interface that is displayed on the touch-screen display. Alternatively or in addition, the examples of computing devices may include other various input mechanisms and devices, such as a keyboard, mouse, on-screen keyboard, remote control device, game controller, or any other type of user-initiated and/or user-selectable input device. In implementations, the computing device 102 may include a touch input module 116 that recognizes touch input sensor data 118, such as on-screen keyboard character inputs and other user-selected touch inputs.

The computing device includes a text box control module 120 that can be implemented as computer-executable instructions, such as a software application or module that is executed by one or more processors to implement the various embodiments described herein. The text box control module includes a text box control 122 that can be instantiated as a text box 124 for display on the integrated display 114 of a computing device 102, or for display on the display device 110. The text box 124 can be implemented as any type of text entry box, password entry box, or form control that is instantiated in a user interface, such as a form, HTML page, or document to facilitate user input of character entries 126 (e.g., letters, numbers, and/or other alphanumeric characters). In embodiments, the text box control 122 includes a text box clearing selector 128 that can be incorporated as part of the text box control and bound to the text box control when instantiated in a user interface, such as in a form, page, or document that includes a text box 124 for character entries 126.

Figure 2:
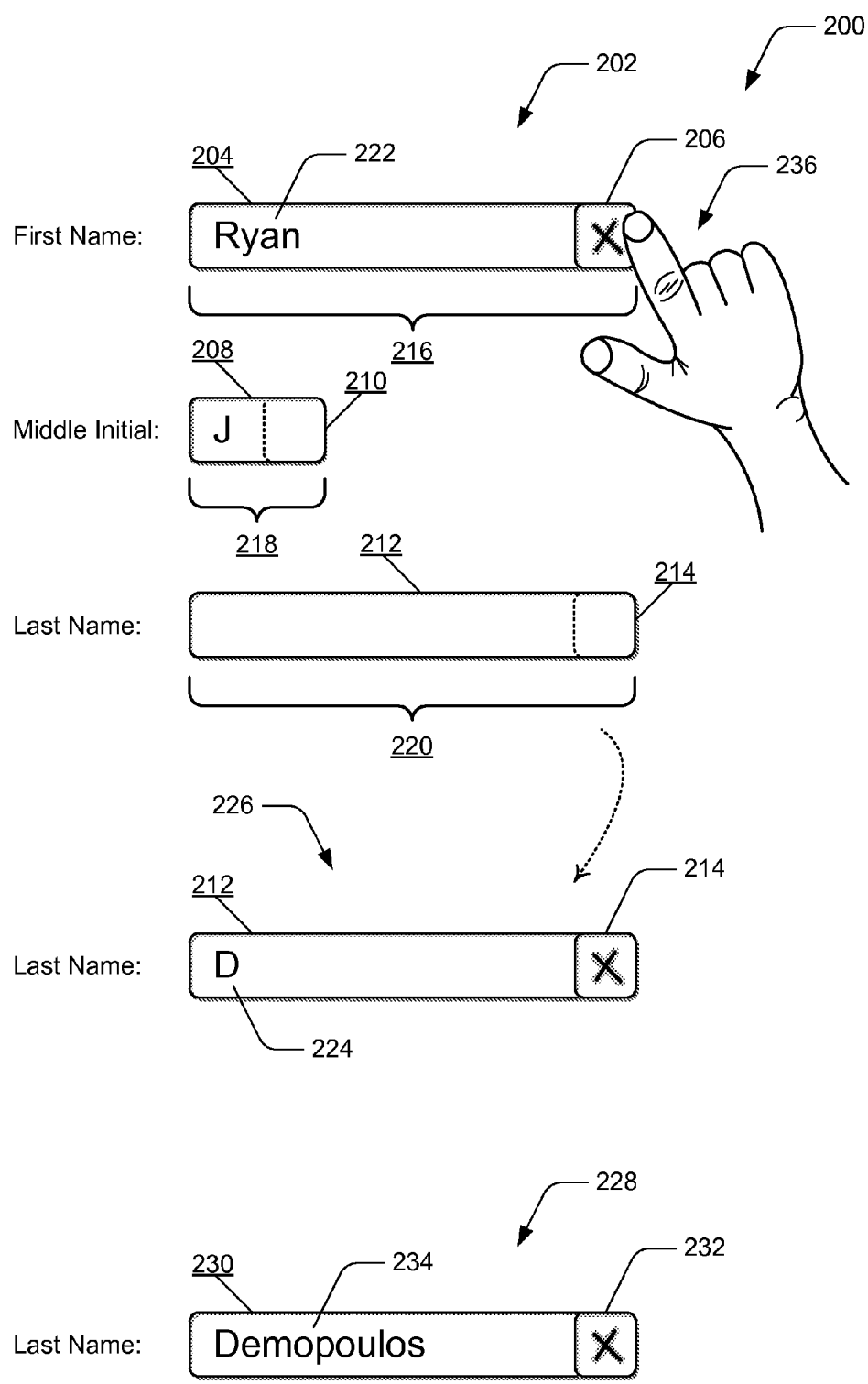
FIG. 2 illustrates examples of a text box clearing selector in accordance with one or more embodiments.

FIG. 2 illustrates examples 200 of text boxes that include a text box clearing selector, such as can be implemented by the computing device 102 and the various components described with reference to FIG. 1. For example, a user interface, such as a form or HTML page, can include text boxes in which a user enters information, such as his or her first name, middle initial, and last name as shown at 202. The text box control module 120 at computing device 102 can instantiate the text boxes that each include a text box clearing selector, which is implemented for user-selection to clear character entries from a respective text box.

In the examples, a first text box 204 includes a text box clearing selector 206; a second text box 208 includes a text box clearing selector 210, which is concealed from view when the text box is displayed in this example; and a third text box 212 includes a text box clearing selector 214, which is initially concealed from view when the text box is displayed in this example. The dashed outline of the concealed text box clearing selectors 210 and 214 are shown merely to illustrate that the respective text boxes 208 and 212 are implemented to include a text box clearing selector. In practice, the text box clearing selectors are concealed from view and not visible to the user.

Any of the text boxes can include a parameter that indicates a maximum number of character entries the text box is implemented to receive. This is also commonly referred to as the width of a text box. For example, the text box 204 includes a width parameter 216 that indicates a width of the text box. Similarly, the text boxes 208 and 212 include respective width parameters 218 and 220 that indicate a width of each text box. The width parameter of a text box can be specified by an application developer as a part of a text box editing interface. In this example, a width parameter encompasses all of a respective text box, to include the text box clearing selector for the text box. For example, the width parameter 216 encompasses all of the text box 204, to include the text box clearing selector 206. Alternatively, a text box clearing selector may be positioned for display outside the width of a text box and/or not included within the width parameter.

In embodiments, the text box clearing selector of a text box can be displayed based on a selector display condition, such as based on whether the width parameter (e.g., the width of a text box) is at least a minimum number. For example, the text box 204 may have a width parameter 216 of ten characters, which indicates that the text box can have ten character entries. The selector display condition may then be based on whether the width parameter is at least five character entries, in which case, the text box clearing selector 206 is displayed when at least one character entry is received in the text box. Alternatively, the text box clearing selector may be implemented to display based on whether the width parameter is at least a minimum number and also based on a minimum number of character entries 222 received in the text box. For example, the selector display condition may be based on whether the width parameter 216 is a minimum of at least five character entries, and at least four character entries 222 have been entered in the text box, such as shown in the text box 204.

In the examples, the text box 208 has a width parameter 218 of one, in which case, the text box clearing selector 210 for the text box remains concealed from view when the text box is displayed, and when the selector display condition is based on whether the width parameter is at least more than one character entry. Similar to the text box 204, the text box 212 may have a width parameter 220 of twenty, which indicates that the text box can have twenty character entries. In this example, the text box clearing selector 214 of the text box 212 is initially concealed from view if the selector display condition is based on whether the width parameter is at least ten character entries and also whether at least one character entry is received in the text box. When at least one character entry 224 is received in the text box as shown in the transition at 226, the text box clearing selector 214 is then displayed for user-selection to clear character entries from the text box.

Alternatively, a selector display condition may simply be based on a minimum number of character entries received in the text box, regardless of the width parameter. For example, as shown at 228, an alternative text box 230 includes a text box clearing selector 232 that is implemented to be initially concealed from view, and then displayed when a minimum number of character entries 234 are entered in the text box, such as a minimum of five character entries. In implementations, the width parameters and the selector display conditions (e.g., a minimum width parameter, and at least a minimum number of character entries) are optionally configurable and can be specified by an application developer. As described above, a developer can implement any form text entry box as a text box that includes a text box clearing selector, even for a text box that is implemented to receive a maximum of just one character entry, such as the text box 208 that has a width parameter 218 of only one and the text box clearing selector 210 is concealed from view. This eliminates a developer having to determine which type of text box to implement, one with a clearing selector or one without the clearing selector, and then having to apply a width threshold.

The various text box clearing selectors of the respective text boxes are implemented for user-selection to clear character entries from a text box. For example, on a touch-screen display, a user can press the text box clearing selector 206 as shown at 236 to initiate clearing the character entries 222 from the text box 204. Alternatively, a user may select the text box clearing selector by holding down a mouse button, with a keyboard shortcut, or other user-selectable mechanism. In implementations, the text box control module 120 at the computing device 102 initiates clearing the character entries from the text box when the user-selection of the text box clearing selector is received. Additionally, the text box control module then initiates concealing the text box clearing selector from view when the character entries are cleared from the text box (e.g., such as the text box 212 that includes the text box clearing selector 214 concealed from view when no character entries are entered in the text box).

In the examples 200, the text box clearing selector 206 is shown positioned on the right side of the text box 204 so as to avoid blocking the view of the text box when the user selects the text box clearing selector with his or her right hand, such as shown at 236. Although the text box clearing selector is shown on the right side of the text box, the text box clearing selector may be implemented in any other position associated with the text box. For example, the position of a text box clearing selector relative to the text box may be user-configurable, such as for a left-handed user who may prefer the text box clearing selector positioned on the left side of the text box.

Example method 300 is described with reference to FIG. 3 in accordance with one or more embodiments of a text box clearing selector. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
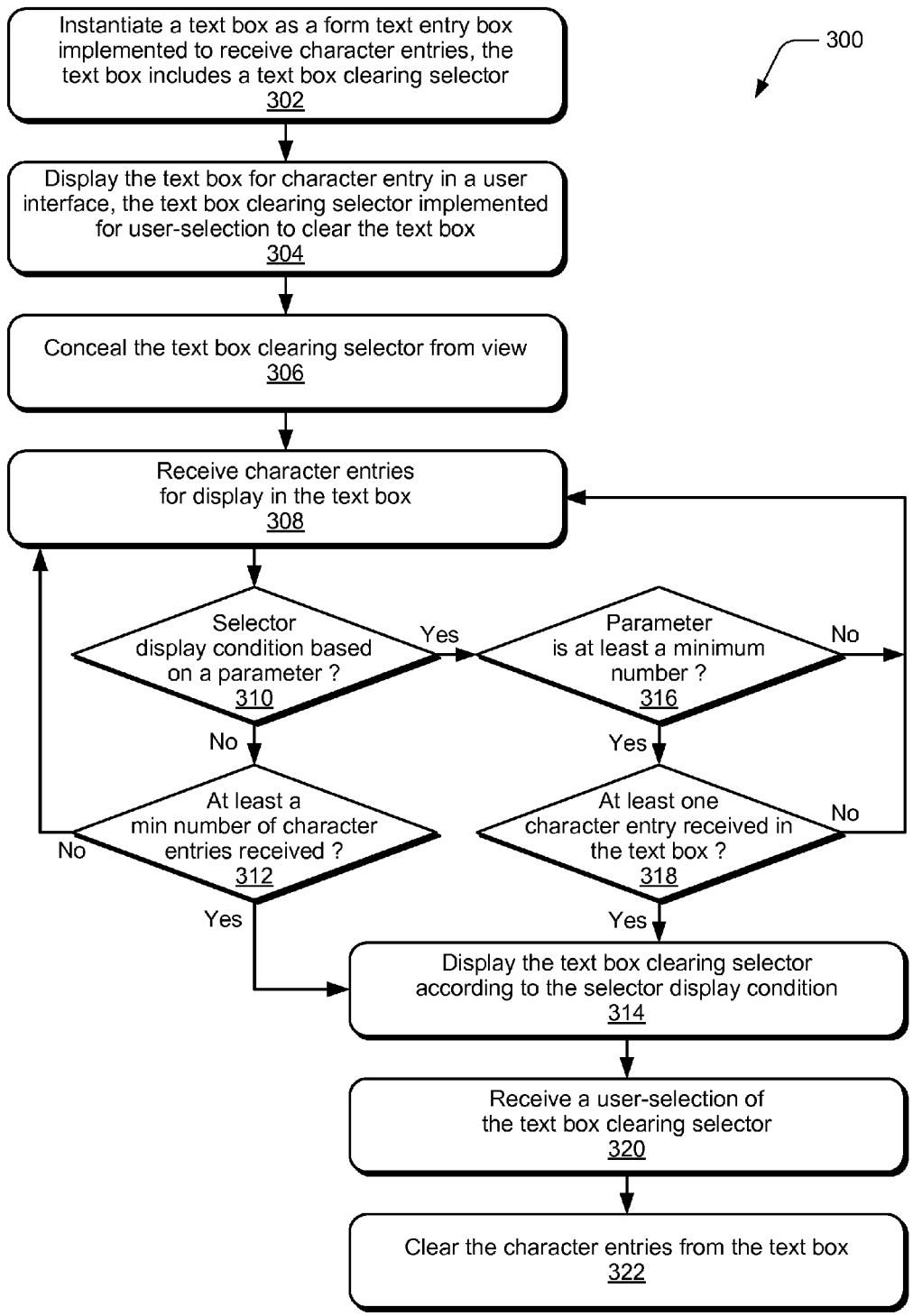
FIG. 3 illustrates example method(s) of a text box clearing selector in accordance with one or more embodiments.

FIG. 3 illustrates example method(s) 300 of a text box clearing selector. The order in which the method blocks are described are not intended to be construed as a limitation, and any number of the described method blocks can be combined in any order to implement a method, or an alternate method.

At block 302, a text box is instantiated as a form text entry box implemented to receive character entries, and the text box includes a text box clear selector. At block 304, the text box is displayed for character entry in a user interface, and the text box clearing selector is implemented for user-selection to clear the text box. For example, the text box control module 120 at computing device 102 (FIG. 1) instantiates for display the text box 204 that includes the text box clearing selector 206 (FIG. 2); the text box 208 that includes the text box clearing selector 210; the text box 212 that includes the text box clearing selector 214; and the text box 230 that includes the text box clear selector 232. Any of the text boxes can be implemented to receive one or more character entries by designation of a width parameter that indicates a maximum number of the character entries for a text box.

At block 306, the text box clearing selector is concealed from view. For example, the text box 208 includes the text box clearing selector 210, which is concealed from view when the text box is displayed because the width parameter 218 of the text box (e.g., one in this example) is not at least a minimum number of character entries. The text box 212 includes the text box clearing selector 214, which is initially concealed from view when the text box is displayed because a character entry has not yet been received for display in the text box. When the one character entry 224 is received in the text box 212 as shown in the transition at 226, the text box clearing selector 214 is then displayed for user-selection to clear character entries from the text box.

At block 308, character entries are received for display in the text box. For example, the computing device 102 receives the character entries 126 from any type of input device, such as a keyboard, mouse, on-screen keyboard, remote control device, game controller, or any other type of user-initiated and/or user-selectable input device. In the examples 200, the text box 204 includes character entries 222 and the text box 230 includes the character entries 234.

At block 310, a determination is made as to whether a selector display condition is based on a parameter, such as based on a width parameter of a text box that indicates a maximum number of character entries the text box is implemented to receive. If the selector display condition is not based on a parameter (i.e., "no" from block 310), then at block 312, a determination is made as to whether a minimum number of character entries have been received for display in the text box. A selector display condition may simply be based on a minimum number of character entries received in a text box, regardless of the width parameter. For example, the text box 230 includes the text box clearing selector 232, which is initially concealed from view and then displayed when a minimum number of character entries are entered in the text box.

If at least a minimum number of character entries have been received for display in the text box (i.e., "yes" from block 312), then at block 314, the text box clearing selector is displayed according to the selector display condition. If the minimum number of character entries has not been received (i.e., "no" from block 312), then the method continues at block 308 to receive character entries for display in the text box.

If the selector display condition is based on a parameter, such as based on the width parameter of the text box (i.e., "yes" from block 310), then at block 316, a determination is made as to whether the parameter is at least a minimum number. For example, the text box 204 may have a width parameter 216 of ten characters, which indicates that the text box can have ten character entries. The selector display condition may then be based on whether the width parameter is at least five character entries, in which case, the text box clearing selector 206 is displayed when at least one character entry is received in the text box.

If the parameter is at least a minimum number (i.e., "yes" from block 316), then at block 318, a determination is made as to whether at least one character entry has been received in the text box. If at least one character entry has been received for display in the text box (i.e., "yes" from block 318), then at block 314, the text box clearing selector is displayed according to the selector display condition. If the parameter is not at least a minimum number (i.e., "no" from block 316), or if a character entry has not been received for display in the text box (i.e., "no" from block 318), then the method continues at block 308 to receive character entries for display in the text box.

At block 320, a user-selection of the text box clearing selector is received and, at block 322, the character entries are cleared from the text box. For example, on a touch-screen display, a user can press the text box clearing selector 206 as shown at 236 to initiate clearing the character entries 222 from the text box 204. The text box control module 120 at the computing device 102 initiates clearing the character entries from the text box when the user-selection of the text box clearing selector is received. The method can then continue at block 306 to conceal the text box clearing selector from view. For example, the text box control module then initiates concealing the text box clearing selector from view when the character entries are cleared from the text box (e.g., such as the text box 212 that includes the text box clearing selector 214 concealed from view when no character entries are entered in the text box).

Figure 4:
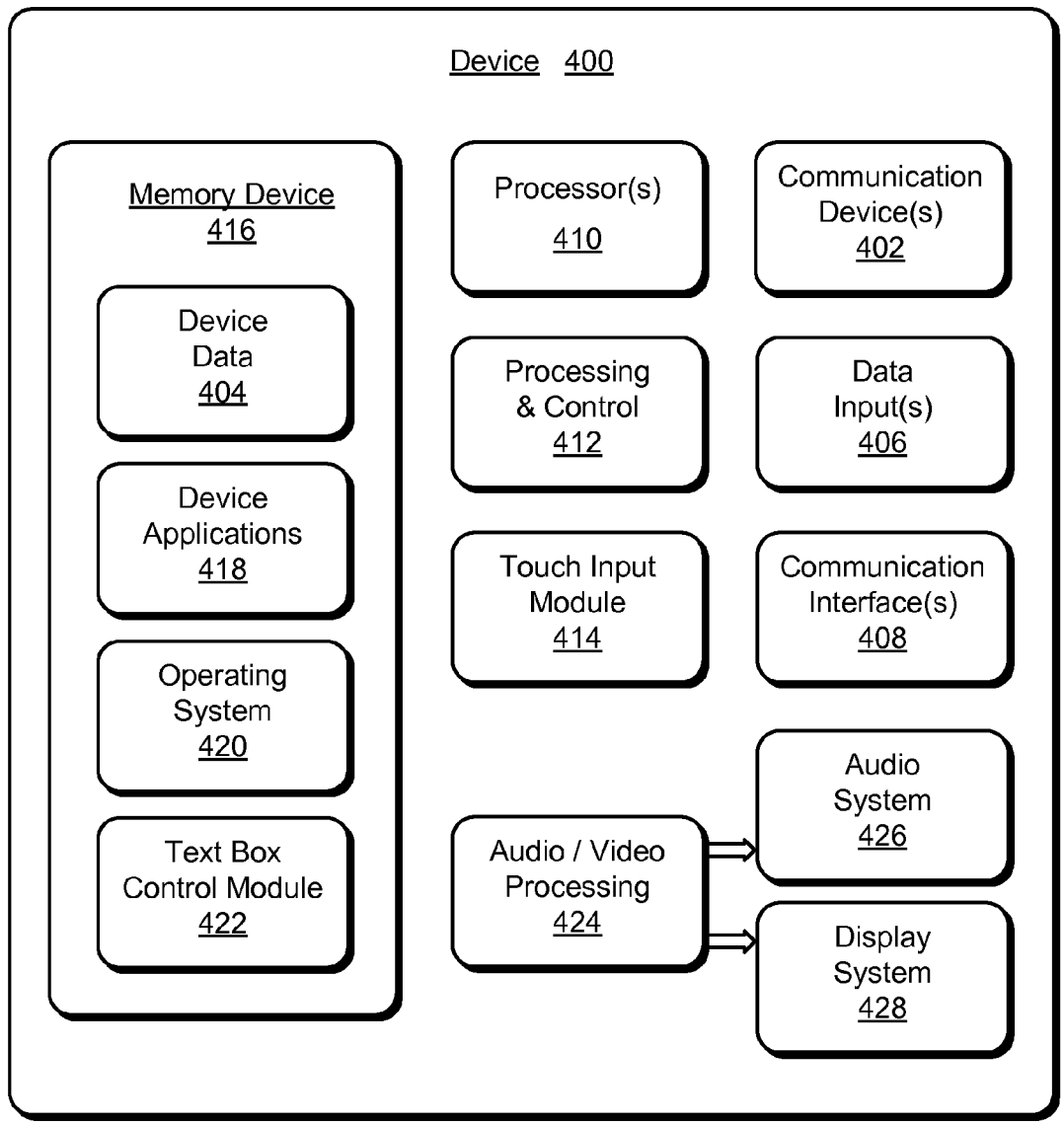
FIG. 4 illustrates various components of an example device that can implement embodiments of a text box clearing selector.

FIG. 4 illustrates various components of an example device 400 that can be implemented as any of the devices, or services implemented by devices, described with reference to the previous FIGS. 1-3. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 400 includes communication devices 402 that enable wired and/or wireless communication of device data 404, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 406 via which any type of data, media content, and/or inputs can be received, such as user-selectable inputs and any other type of audio, video, and/or image data received from any content and/or data source.

The device 400 also includes communication interfaces 408, such as any one or more of a serial, parallel, network, or wireless interface. The communication interfaces provide a connection and/or communication links between the device and a communication network by which other electronic, computing, and communication devices communicate data with the device.

The device 400 includes one or more processors 410 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 412. In embodiments, the device 400 can also include a touch input module 414 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 400 also includes one or more memory devices 416 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 416 provides data storage mechanisms to store the device data 404, other types of information and/or data, and various device applications 418. For example, an operating system 420 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 418 include a text box control module 422 that implements embodiments of a text box clearing selector as described herein.

The device 400 also includes an audio and/or video processing system 424 that generates audio data for an audio system 426 and/or generates display data for a display system 428. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of a text box clearing selector have been described in language specific to features and/or methods, the appended claims are not necessarily limited to the specific features or methods described. Rather, the specific features and methods are disclosed as example implementations of a text box clearing selector.

The invention claimed is:

1. A method, comprising:
displaying a text box configured for character entry in a user interface, the text box including a text box clearing selector for user-selection to clear the text box, the text box clearing selector initially concealed from view when the text box is displayed;
receiving character entries in the text box; and
displaying the text box clearing selector according to a selector display condition that is based on a parameter that indicates a maximum number of character entries the text box is implemented to receive, the selector display condition being met if the parameter is at least a minimum number.

2. A method as recited in claim 1, further comprising:
said displaying the text box clearing selector if the parameter is at least a minimum number;
clearing the character entries from the text box when the user-selection of the text box clearing selector is received; and
concealing the text box clearing selector from view when the character entries are cleared from the text box.

3. A method as recited in claim 1, wherein said displaying the text box clearing selector if the parameter is at least a minimum number and when at least one of the character entries is received.

4. A method as recited in claim 1, wherein the selector display condition is based on a number of the character entries that are received, said displaying the text box clearing selector if at least a minimum number of the character entries are received.

5. A method as recited in claim 1, further comprising instantiating the text box that includes the text box clearing selector as a form text entry box that is implemented to receive a maximum one character entry.

6. A method as recited in claim 1, wherein said displaying the text box clearing selector is determined for multiple text boxes in the user interface.

7. A computing device, comprising:
a display device to display a text box configured for character entry in a user interface;
at least a memory and a processor to implement a text box control module that is configured to:
instantiate the text box that includes a text box clearing selector configured for user-selection to clear the text box, the text box clearing selector initially concealed from view when the text box is displayed; and
initiate a display of the text box clearing selector according to a selector display condition being met, the selector display condition based on a parameter that indicates a maximum number of character entries the text box is implemented to receive, and the selector display condition being met if the parameter is at least a minimum number.

8. A computing device as recited in claim 7, wherein the text box clearing selector is configured to display if the parameter is at least a minimum number and when at least one character entry is received.

9. A computing device as recited in claim 7, wherein the selector display condition is based on a number of character entries that are received, and wherein the text box clearing selector is configured to display if at least a minimum number of the character entries are received.

10. A computing device as recited in claim 7, wherein the text box control module is configured to instantiate the text box that includes the text box clearing selector as a form text entry box that is implemented to receive a maximum of one character entry.

11. A computing device as recited in claim 7, wherein the text box control module is further configured to initiate clearing character entries from the text box when the user-selection of the text box clearing selector is received.

12. A computing device as recited in claim 11, wherein the text box control module is further configured to initiate concealing the text box clearing selector from view when the character entries are cleared from the text box.

13. One or more computer-readable storage memories comprising stored instructions that are executable and, responsive to executing the instructions, a computing device:
instantiates a text box that includes a text box clearing selector configured for user-selection to clear the text box;
displays the text box configured for character entry in a user interface with the text box clearing selector initially concealed from view when the text box is displayed; and
displays the text box clearing selector if a parameter is at least a minimum number and at least one character entry is received, the parameter indicating a maximum number of character entries the text box is implemented to receive and a selector display condition being met if the parameter is at least a minimum number.

14. One or more computer-readable storage memories as recited in claim 13, further comprising additional instructions that are executable and, responsive to executing the additional instructions, the computing device displays the text box clearing selector if the parameter is at least the minimum number.

15. One or more computer-readable storage memories as recited in claim 13, further comprising additional instructions that are executable and, responsive to executing the additional instructions, the computing device displays the text box clearing selector if at least a minimum number of character entries are received.

16. One or more computer-readable storage memories as recited in claim 13, further comprising additional instructions that are executable and, responsive to executing the additional instructions, the computing device receives the user-selection of the text box clearing selector and clears character entries from the text box.

17. One or more computer-readable storage memories as recited in claim 16, further comprising additional instructions that are executable and, responsive to executing the additional instructions, the computing device conceals the text box clearing selector from view when the character entries are cleared from the text box.

* * * * *